(12) United States Patent
Markfort

(10) Patent No.: US 8,967,320 B2
(45) Date of Patent: Mar. 3, 2015

(54) STEERING DEVICE FOR A MOTOR VEHICLE, HAVING A STEERING WHEEL AND A SUPERPOSITION GEARING

(75) Inventor: Dieter Markfort, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 437 days.

(21) Appl. No.: 12/991,793

(22) PCT Filed: May 14, 2009

(86) PCT No.: PCT/EP2009/055847
§ 371 (c)(1),
(2), (4) Date: Nov. 9, 2010

(87) PCT Pub. No.: WO2009/138463
PCT Pub. Date: Nov. 19, 2009

(65) Prior Publication Data
US 2011/0056762 A1  Mar. 10, 2011

Related U.S. Application Data

(60) Provisional application No. 61/060,319, filed on Jun. 10, 2008.

(30) Foreign Application Priority Data

May 15, 2008 (DE) .......................... 10 2008 023 753

(51) Int. Cl.
*B62D 5/04* (2006.01)
*B62D 5/00* (2006.01)
*B62D 1/10* (2006.01)

(52) U.S. Cl.
CPC . *B62D 5/008* (2013.01); *B62D 1/10* (2013.01)
USPC .......................... 180/443; 180/444; 180/446

(58) Field of Classification Search
USPC .......................................... 180/444, 443, 446
See application file for complete search history.

(56) References Cited

U.S. PATENT DOCUMENTS 3,800,620 A * 4/1974 Barenyi .......................... 74/552
6,053,270 A * 4/2000 Nishikawa et al. ........... 180/168
(Continued)

FOREIGN PATENT DOCUMENTS

| CN | 1914082 A | 2/2007 |
| CN | 101107146 A | 1/2008 |

(Continued)

OTHER PUBLICATIONS

Notification concerning Transmittal of International Preliminary Report on Patentability (Chapter I of the Patent Cooperation Treaty) from the International Bureau of WIPO for International Application Number PCT/EP2009/055847 dated Nov. 17, 2010, 7 pages.
(Continued)

*Primary Examiner* — Joseph Rocca
*Assistant Examiner* — Marlon Arce
(74) *Attorney, Agent, or Firm* — Fitch Even Tabin & Flannery LLP

(57) ABSTRACT

A steering device for a motor vehicle is provided. The steering device comprises a steering wheel, a superposition gearing and a gearing housing, wherein the superposition gearing is arranged in the gearing housing. The superposition gearing is designed to transmit a motor-driven adjusting movement to a steering shaft. The steering wheel forms a steering wheel base which serves for a connection to the steering shaft. It is provided that at least one constituent of the gearing housing, which constituent serves for mounting and/or fixing a gearing element of the superposition gearing or of a drive motor, is integrated into and formed in one piece with the steering wheel base of the steering wheel.

13 Claims, 5 Drawing Sheets

(56) References Cited

U.S. PATENT DOCUMENTS

| | | | |
|---|---|---|---|
| 6,892,605 B2 * | 5/2005 | Menjak | 74/552 |
| 7,648,004 B1 * | 1/2010 | Larouche et al. | 180/443 |
| 7,931,296 B2 * | 4/2011 | Choi | 280/731 |
| 2005/0258627 A1 | 11/2005 | Sadakata et al. | |
| 2008/0011118 A1 | 1/2008 | Meissner et al. | |
| 2008/0023951 A1 | 1/2008 | Al-Samarae et al. | |
| 2008/0141814 A1 | 6/2008 | Markfort | |

FOREIGN PATENT DOCUMENTS

| | | |
|---|---|---|
| DE | 101 60 313 A1 | 3/2003 |
| DE | 10 2006 055 774 A1 | 5/2008 |
| JP | 2004-182061 A | 7/2004 |
| WO | 2004/005108 A1 | 1/2004 |
| WO | 2007/009420 A1 | 1/2007 |

OTHER PUBLICATIONS

English Translation of Office Action issued in counterpart Chinese Application No. 200980116967.3 dated Sep. 7, 2012 (10 pages).

Office Action issued in counterpart Japanese Application No. 2011-508924 dated Jun. 3, 2013 and English translation of the same (3 pages).

* cited by examiner

STEERING DEVICE FOR A MOTOR VEHICLE, HAVING A STEERING WHEEL AND A SUPERPOSITION GEARING

CROSS-REFERENCE TO RELATED APPLICATIONS

This application is a National Phase Patent Application of International Patent Application Number PCT/EP2009/055847, filed on May 14, 2009, which claims priority of German Patent Application Number 10 2008 023 753.1, filed on May 15, 2008 and U.S. Patent Application 61/060,319 filed on Jun. 10, 2008, the entire contents of which are hereby incorporated herein by reference in their entirety.

FIELD OF THE INVENTION

The invention relates to a steering device for a motor vehicle, having a steering wheel and having a superposition gearing.

BACKGROUND

Superposition steering systems are characterized in that a steering angle input by a driver can have a further angle superposed on it by an actuator. DE 101 313 A1 discloses a superposition gearing which is arranged between an input shaft, which is connected to the steering wheel, and an output shaft, which is connected to a steering gear. WO 2007/009420 A1 describes a superposition gearing for a superposition steering system, in which the actuator for the superposition steering system is arranged in the steering wheel. Here, the actuator is formed as a separate module.

Superposition steering systems are used for example in a so-called dynamic steering system, in which the superposition of a steering angle takes place in a speed-dependent fashion.

SUMMARY

The present invention is based on the object of providing a steering device for a motor vehicle having a superposition gearing, which steering device has a simple design.

According to an exemplary embodiment of the invention, it is provided that at least one constituent of the gearing housing, which constituent serves for mounting and/or fixing a gearing element of the superposition gearing or of a drive motor, is integrated into the steering wheel base of the steering wheel, or at least one constituent of the gearing housing at least partially forms the steering wheel base. In a first variant of the invention, the steering wheel base, also referred to as the steering wheel hub, therefore performs, in addition to its function of providing a connection and coupling of the steering wheel to the steering shaft, the further function of providing at least one constituent of the gearing housing. In a second variant of the invention, it is provided that at least one constituent of the gearing housing at least partially forms the steering wheel base, and therefore entirely or partially takes over the function of the steering wheel base. This also encompasses the situation that at least a part of the steering wheel base is formed overall by the gearing housing.

In one exemplary refinement, at least one bearing receptacle for radial and/or axial mounting of a gearing element is integrated into the steering wheel base. Within the context of the present description, bearing elements are also bearing receptacles such as for example bearing shells or bearing openings which hold bearings of the superposition gearing. Furthermore, it can be provided that a holding flange or a constituent of a holding flange or some other fastening means for fixing the drive motor is integrated into the steering wheel base.

In one exemplary refinement, the superposition gearing is a worm gear mechanism with a drive worm and a worm gear. For this case, in one refinement, at least one bearing receptacle of a radial and/or axial bearing of the drive worm is integrated into the steering wheel base. It is also provided in one embodiment that at least one bearing receptacle for mounting the worm gear is integrated into the steering wheel base.

In a further exemplary refinement, the housing is of multi-part design, with at least one housing part being integrated into the steering wheel base and with it being possible for the individual housing parts to be connected to one another. In one embodiment variant in this respect, the gearing housing has two housing shells and one of the housing shells is integrated into the steering wheel base, that is to say one of the housing shells is formed by the steering wheel base. The constituents of the gearing housing which are integrated into the steering wheel base of the steering wheel are constituents of the one housing shell. The other housing shell is placed on after the gearing elements and/or the motor have been inserted into the housing shell formed by the steering wheel base. It is likewise possible for the gearing elements and/or the drive motor to be pre-mounted in the second housing shell which is placed onto the housing shell formed by the steering wheel base.

In one exemplary refinement, the at least one constituent of the gearing housing which is integrated into the steering wheel base of the steering wheel is formed in one piece with the steering wheel base. The integration of the constituent of the gearing housing into the steering wheel base takes place here for example by virtue of corresponding regions of the steering wheel skeleton being correspondingly integrally formed by casting and subsequently being machined. It is likewise possible for the at least one constituent of the gearing housing to be produced separately and to subsequently be captively connected to the steering wheel base. The captive connection takes place here for example by means of welding or adhesive bonding.

In an alternative exemplary variant of the invention, the steering wheel base is formed, at least in a central region in which the superposition gearing is in engagement with the steering shaft, by the gearing housing or by a partial region of the gearing housing. It is provided in particular that the steering wheel base has an opening which closes off the gearing housing or a partial region of the gearing housing. Here, the gearing housing or the partial region is inserted into the opening. In this variant of the invention, the function of the steering wheel base, specifically the connection and coupling to the steering shaft, is taken over by the gearing housing. Accordingly, the gearing housing also comprises an opening, into which the steering shaft projects for the purpose of connection to the steering wheel and coupling to the superposition gearing.

In one exemplary refinement of said variant of the invention, it is provided that the steering wheel base is formed entirely by the gearing housing and said gearing housing is connected directly to spokes of the steering wheel. A steering wheel base edge region which adjoins a central opening is no longer provided in this variant.

It is pointed out that the constituent of the gearing housing which, according to the invention, is integrated into or forms the steering wheel base can be formed both on that side of the steering wheel base which faces toward the driver or else on that side of the steering wheel base which faces away from the driver.

A manual adjusting movement of the steering wheel is transmitted, in the same way as an adjusting movement provided by the drive motor, via the superposition gearing to the steering shaft. This makes it possible for the gearing housing, as a result of its partial integration into the steering wheel, to be rotationally fixedly connected to the latter, such that a steering movement by a driver is transmitted, in the same way as a steering movement provided by the superposition gearing, via the superposition gearing to the steering shaft.

BRIEF DESCRIPTION OF THE DRAWINGS

The invention is explained in more detail below with reference to the figures of the drawing on the basis of a plurality of exemplary embodiments.

DETAILED DESCRIPTION

FIGS. 1 to 4 show a first exemplary embodiment of a steering device having a superposition gearing which is suitable for superposing a further steering angle on a steering angle input by a drive. Here, the superposition gearing together with a drive motor forms an actuator of a superposition steering system.

Figure 1:
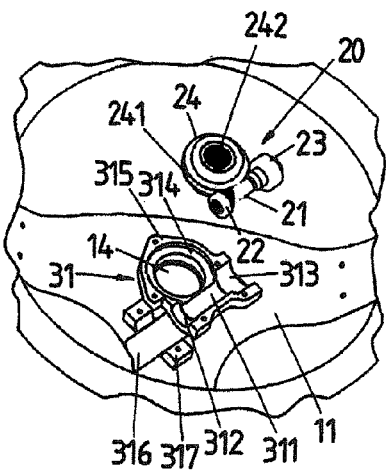
FIG. 1 shows an exploded illustration of an exemplary embodiment of a steering wheel base with integrated housing constituents and gearing elements of a superposition gearing.
Figure 2:
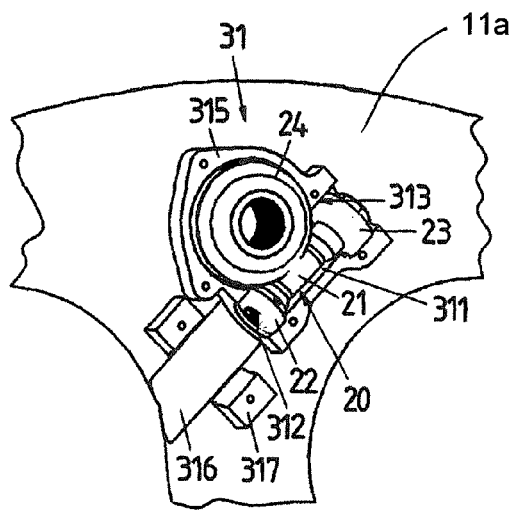
FIG. 2 shows the arrangement from FIG. 1 with gearing elements inserted into the steering wheel base.
Figure 3:
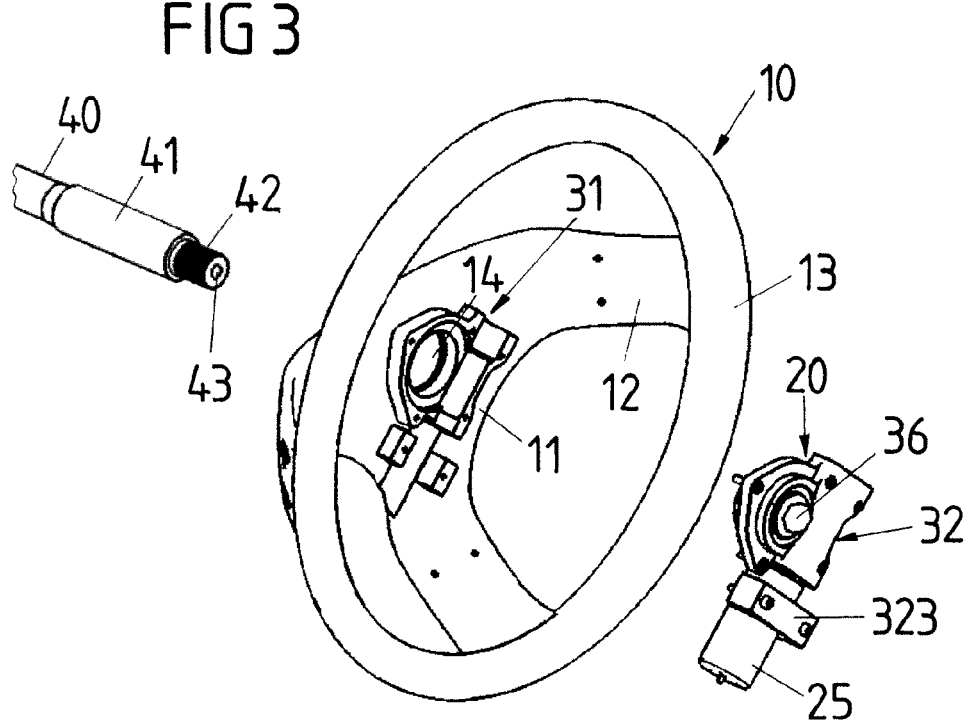
FIG. 3 shows an exploded illustration of a steering device having a steering wheel with a steering wheel base as per FIG. 1, a steering shaft and a gearing housing half.
Figure 4:
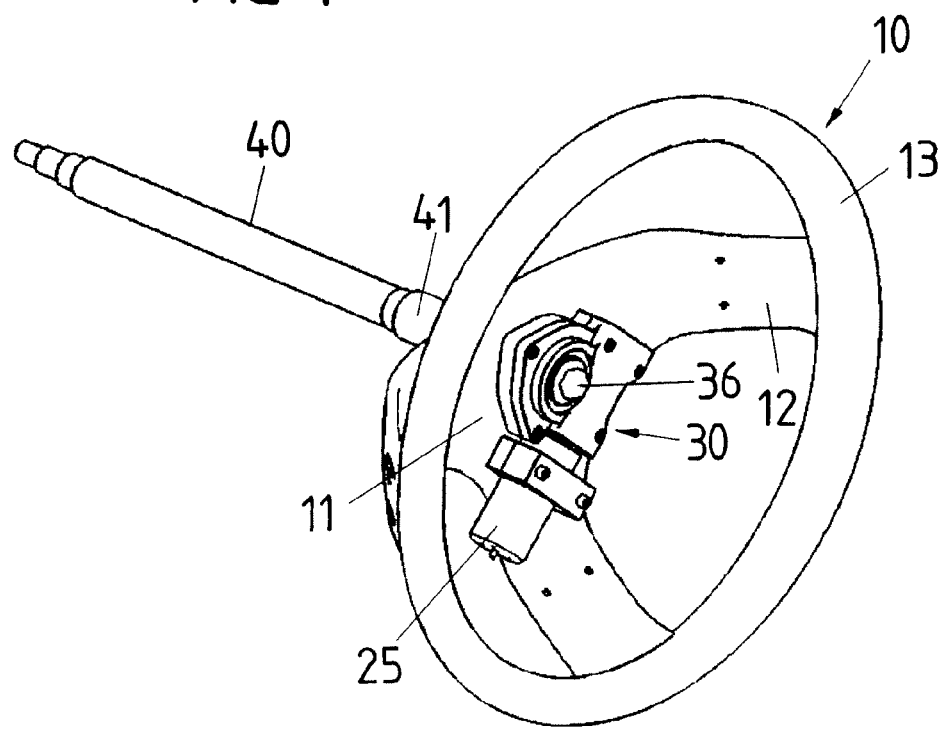
FIG. 4 shows the steering device of FIG. 3 in the assembled state.

FIGS. 3 and 4 show the constituents of the steering device in an exploded illustration and in the assembled state. The steering device comprises a steering wheel 10, a superposition gearing 20 which is arranged in a gearing housing 30, a drive motor 25, and a steering shaft 40. The gearing housing 30, which is illustrated in FIG. 4 in the assembled state, is composed of two housing halves 31, 32, as per the exploded illustration of FIG. 3. The superposition gearing 20 is not shown in detail in FIGS. 3 and 4, since it is hidden by the gearing housing 30 or parts thereof, but is illustrated in FIGS. 1 and 2.

The steering shaft 40 has, at its end facing toward the steering wheel 10, a steering wheel pin 41 with an external toothing 42 and with a central bore 43 which is provided with a thread. Said steering wheel pin 41 is connected, in a manner known per se, to a steering gear (not illustrated). It is also possible for a servo motor of a servo steering system to additionally be coupled to the steering shaft 40.

It is pointed out that the steering shaft 40 need not necessarily be formed as a cylindrical element. Within the context of the present description, the steering shaft refers to any element which transmits a rotary movement of the superposition gearing or of the steering wheel to a steering gear. It is also pointed out that the steering shaft 40 can be radially and/or axially mounted by means of bearing elements (not illustrated).

The steering wheel 10 is composed of a steering wheel rim 13, a plurality of spokes 12 and a steering wheel base 11. The number and shape of the spokes 12 is to be understood merely as an example. The steering wheel base 11 serves, in interaction with the superposition gearing, for fastening and coupling the steering wheel to the steering shaft 40. For this purpose, the steering wheel base 11 has a central opening 14 through which the steering wheel pin 41 with the external toothing 42 projects, wherein the external toothing 42 engages, in the assembled state, with a drive-output-side gearing element of the superposition gearing, as will be explained in more detail.

It is pointed out that the steering wheel base 11 is also referred to as the steering wheel hub. Said steering wheel base 11—aside from the integration of constituents of the gearing housing, which will be explained in more detail—is formed substantially as a disk which forms the central opening 14. At its edge region, at the transition points to the spokes 12, the steering wheel base 11 is of curved design, such that a continuous transition to the spokes 12 is provided in the illustrated exemplary embodiment. Other embodiments of the steering wheel base and other transitions to the spokes are however also possible.

As already mentioned, the superposition gearing 20 is illustrated in FIGS. 1 and 2. Said superposition gearing 20 is formed, as in the illustrated embodiment variant, as a worm gear mechanism with a drive worm 21 and a worm gear 24. The drive worm 21 is mounted radially, and also axially in one embodiment, by two bearings 22, 23. The drive worm 21 is driven by the electric drive motor 25 (cf. FIGS. 3, 4). The worm gear 24 has an external toothing 241 which meshes with the drive worm 21. The worm gear 24 additionally has a central opening 242 which is provided with an internal toothing, which opening 242, in the assembled state, meshes with the external toothing 42 of the steering shaft 40 and can transmit a torque to the latter. Alternatively, it is also possible for a sleeve which is provided with an internal toothing to be provided for transmitting torque, which sleeve is pressed into the worm gear 24.

The worm gear mechanism 20 is arranged in the gearing housing 30 and the latter is connected to the steering wheel base 11. Here, in the present exemplary embodiment, the gearing housing 30 forms two housing halves 31, 32. One of the housing halves 31 is formed by the steering wheel base 11, as can be seen in particular from FIGS. 1 and 2.

The steering wheel base 11 thus forms structures which serve for mounting and fixing the gearing elements of the worm gear mechanism 20 and of the drive motor 25. In particular, in the illustrated exemplary embodiment, the following structures are integrated into the steering wheel base 11:

a partially cylindrical holding region 311 for holding the drive worm 21;
a first bearing receptacle 312 for holding the bearing 22 of the drive worm 21;
a second bearing receptacle 313 for holding the second bearing 23 of the drive worm;

a circular region 314 for holding and mounting the worm gear 24;

a flange-like region 315 which serves for fastening the other housing shell 32;

a partially cylindrical holding region 316 for holding the drive motor 25; and a holding flange 317 for fastening the drive motor 25 on the housing.

The integration of the structures into the steering wheel 10 takes place for example during the production of the steering wheel skeleton. The integrated structures are raised in relation to the steering wheel base itself.

In FIG. 2, the drive worm 21 and the worm gear 24 are inserted into the corresponding constituents, which are formed by the steering wheel base 11, of the gearing housing.

It is pointed out that the integration of constituents of the gearing housing into the steering wheel base 11 in FIGS. 1 and 2 is to be understood merely as an example. It is possible for other differently-shaped and differently-arranged constituents of a gearing housing to be integrated into the steering wheel base 11. For example, it is conceivable for only one bearing receptacle for a drive worm or a worm gear or other gearing elements to be provided, without the steering wheel base forming a complete housing half which, together with a further housing half, forms a closed gearing housing. The design of the steering wheel base to form a complete housing half is merely one exemplary embodiment.

After the fastening of the gearing elements 21, 24 ad of the drive motor 25, the upper housing half 32 is placed onto the lower housing half 31 which is formed by the steering wheel base 11. Here, it is possible on the one hand for the gearing elements 21, 24 and/or the drive motor 25 to firstly be mounted in the housing half 31 formed by the steering wheel base 11, and for the other housing half 32 to subsequently be placed on. It is likewise conceivable for the gearing elements 21, 24 and/or the drive motor 25 to be pre-mounted in the other housing half 32 and for the latter to then be placed onto the housing half 31 which is integrated into the steering wheel base 11.

Here, the upper housing half 32 forms structures which correspond to the structures, in particular the bearing receptacles 312, 313, holding regions 311, 316, fastening regions 315 and holding flanges 317, of the housing half 31 which is integrated into the steering wheel base 11. For example, the upper housing half 32 forms a bearing receptacle which corresponds to the bearing receptacle 312 of the housing half 31 and which, overall, form a cylindrical bearing receptacle for the bearing 22 of the drive worm 21. Likewise provided is a further holding flange 323 which, together with the holding flange 317, serves for fastening the drive motor 25 to the steering wheel base or to the gearing housing.

Furthermore, in FIGS. 3 and 4, a screw 36 is provided which, in the fully-assembled state, is screwed into the opening 43 of the steering shaft 40 and fixes the steering shaft 40 on the one hand and the gearing housing 30 and the steering wheel 10 on the other hand to one another.

FIG. 4 shows the fully-assembled steering device. The gearing housing 30 is rotationally fixedly connected, on account of its partial integration into the steering wheel base 11, to the steering wheel 10. A steering movement by a driver is therefore transmitted, in the same way as a steering movement provided by the superposition gearing 20, via the worm gear 24 to the steering shaft 40. A steering movement by a driver and an associated rotation of the steering wheel base 11 and of the gearing housing 30 which is partially integrated therein thus leads to a rotation of the drive worm 21 about a steering axis which is identical to the longitudinal axis of the steering shaft 40, which rotation leads in turn to a rotation of the worm gear 24 about the steering axis and therefore to a transmission of the steering movement to the steering shaft 40. Likewise, an adjusting movement provided by means of the drive motor 25 is transmitted via the drive worm 21, which rotates about its longitudinal axis, and the worm gear 24 to the steering shaft 40. This is enabled by means of the steering wheel 10 being mounted on the steering shaft 40 in such a way that the two parts can rotate relative to one another, such that an adjusting movement provided by means of the drive motor 25 does not lead to a corresponding rotation of the steering wheel. A corresponding bearing arrangement is described in WO 2007/009420 A1.

The driver inputs a steering angle. This steering angle input by the driver can have a further angle superposed on it by means of the superposition gearing 20. Here, the steering performed by means of the superposition gearing 20 can supplement or else entirely replace the manual steering by a driver. The drive motor 25 is controlled in a suitable manner by a control device (not illustrated) which receives input signals from one or more sensors.

Figure 2A:
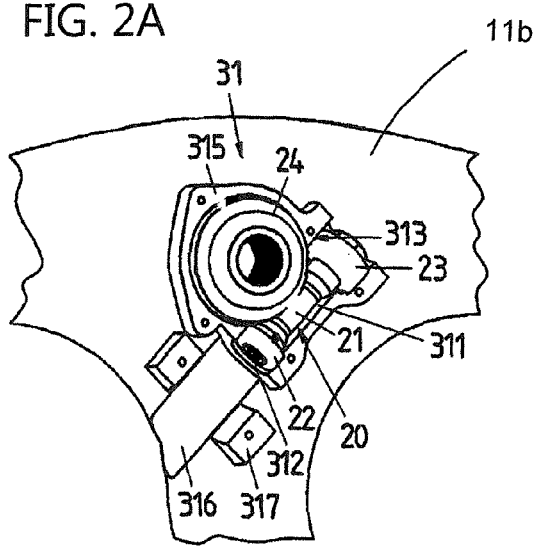
FIG. 2A shows a modified arrangement showing the side of the steering wheel base facing away from the driver.

In one modification of the exemplary embodiment illustrated in FIGS. 1 to 4, constituents of the gearing housing are integrated into the steering wheel base, rather than on the base side 11$a$ facing the driver, on that side 11$b$ which faces away from the driver, as shown in FIG. 2A. A further housing half is then likewise placed onto the steering wheel base on that side which faces away from the driver. The engagement of the drive-output-side gearing element with the toothing of the steering shaft takes place in this case likewise on that side of the steering wheel base which faces away from the driver. The design of the gearing housing and of the superposition gearing can otherwise take place in a corresponding way.

Figure 5:
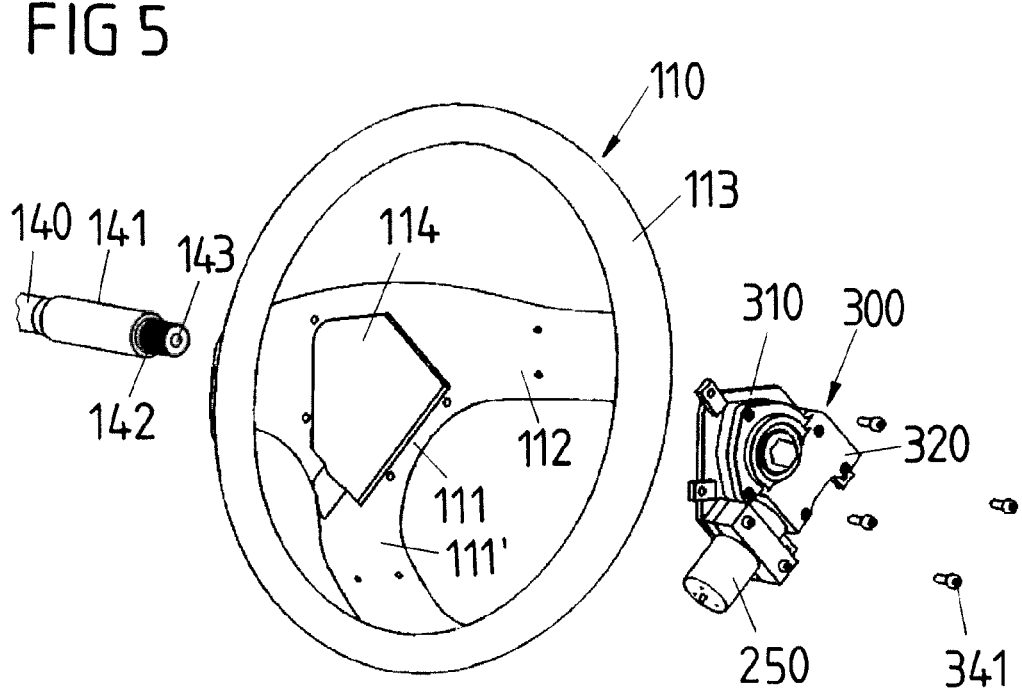
FIG. 5 shows, in an exploded illustration, an exemplary embodiment of a steering device having a steering wheel base provided with an opening and having a gearing housing for closing off said opening.
Figure 6:
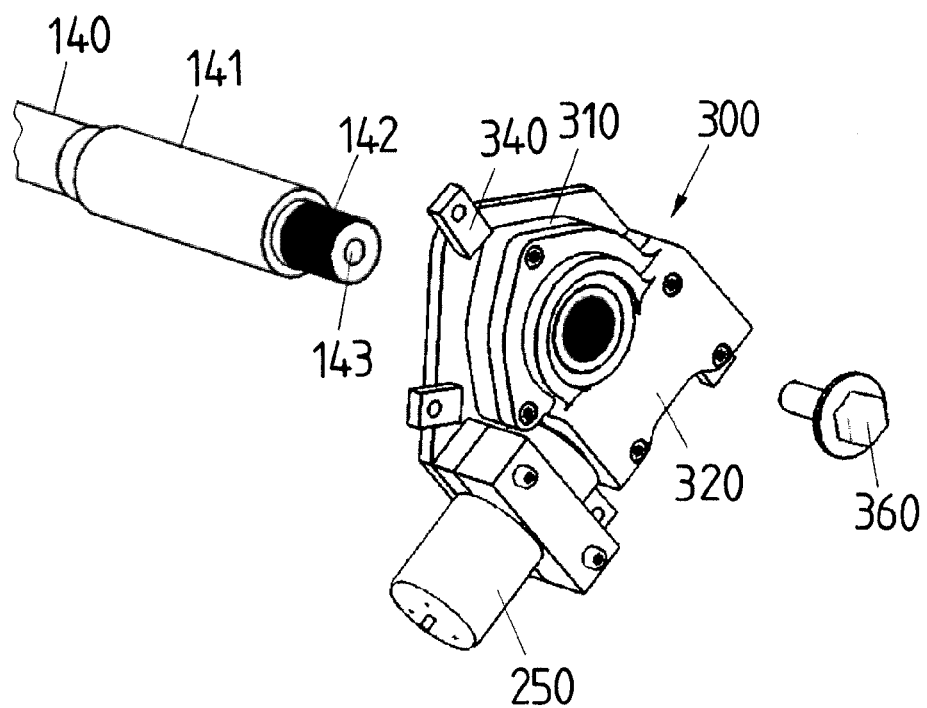
FIG. 6 shows the steering shaft and the gearing housing from FIG. 5 in an enlarged illustration.
Figure 7:
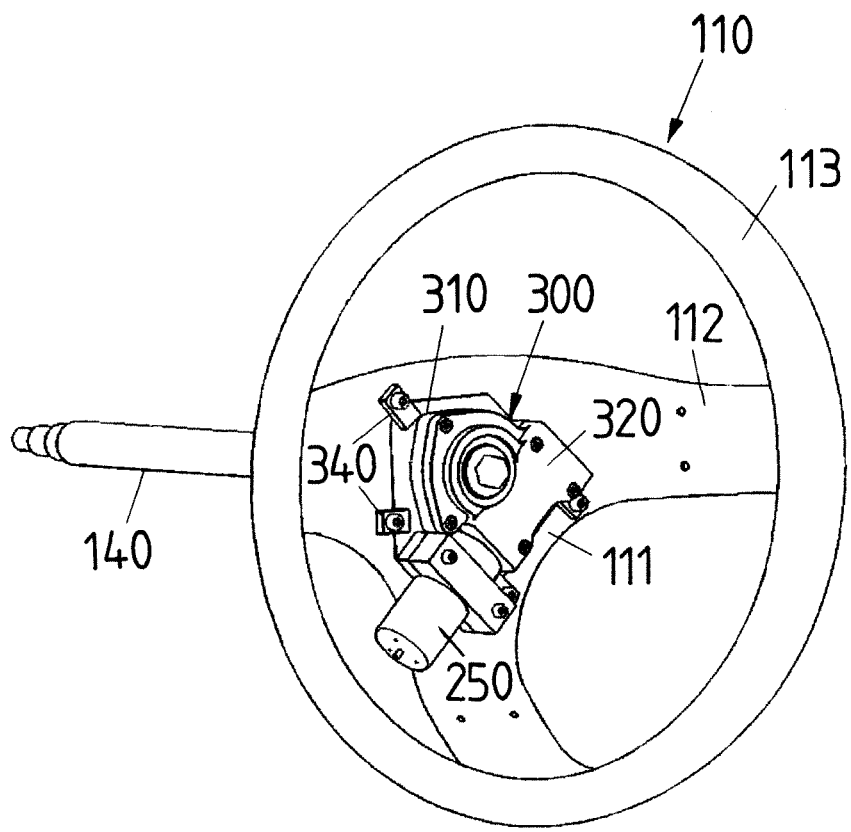
FIG. 7 shows the steering device from FIG. 5 in the assembled state.

FIGS. 5 to 7 illustrate a second exemplary embodiment of the invention. Provided once again are a steering device having a steering shaft 140, a steering wheel 110 and a superposition gearing which is arranged in a gearing housing 300. The steering shaft 140 again has a steering wheel pin 141 with an external toothing 142 and with a central bore 143. The steering wheel 110 again has a steering wheel rim 113, spokes 112 and a steering wheel base 111. The superposition gearing is again formed by a worm gear mechanism having a drive worm, which is driven by a drive motor 250, and a worm gear. In this respect, reference is made to the statements made with regard to FIGS. 1 to 4.

In contrast to the exemplary embodiment of FIGS. 1 to 4, a large-area cutout or opening 114 is located in the steering wheel base 111 in the central region which serves for holding and coupling the steering shaft 140. The gearing housing 300 is inserted into said opening 114, as a result of which the opening 114 is closed off.

Here, the superposition gearing and the gearing housing 300 can for example be formed corresponding to the embodiment of FIGS. 1 to 4. Here, the gearing housing 300 is composed of two housing halves 310, 320, with the elements which are integrated into the steering wheel base in the embodiment of FIGS. 1 to 4 being integrated into a separate housing half 310 which is connected to the other housing half 320 to form the gearing housing 300. Alternatively, the gearing housing can however be formed from a different number of components or differently-formed components.

In the illustrated design of the gearing housing 300 composed of two housing halves 310, 320, the opening 114 is closed off by the lower housing half 310.

As can be seen in particular from FIG. 6, the lower gearing housing half 310 forms, at its side which faces toward the steering wheel base 111, fastening elements in the form of laterally projecting webs 340 with passage holes, which serve for fastening the gearing housing to an edge region 111' of the steering wheel base 111 for example by means of screws 341. It is of course also possible to provide some other form of connection instead of a screw connection. By means of the edge region 111', the steering wheel base 111 is also connected to the spokes 112 of the steering wheel 110.

FIG. 6 also illustrates a screw 360 which, in the fully assembled state, is screwed into the central opening 143 of the steering shaft 140 and fixes the steering shaft 140 on the one hand and the gearing housing 300 and the steering wheel 110 on the other hand to one another.

FIG. 7 shows the fully assembled steering device.

In the embodiment of FIGS. 5 to 7, the gearing housing 300 therefore forms a part of the steering wheel base 111 and takes over the function of the latter. Here, the gearing housing 300 forms a receptacle for coupling the steering shaft 140, wherein in the assembled state, the external toothing 142 of the steering shaft 140 is in engagement with the internal toothing of the worm gear of the superposition gearing or with some other drive-output-side gearing element.

In a modification of the exemplary embodiment of FIGS. 5 to 7, a steering wheel base is dispensed with entirely. In this design, the gearing housing is connected directly to the spokes of the steering wheel.

In a further modification of the exemplary embodiment of FIGS. 5 to 7, the gearing housing, the superposition gearing and the drive motor are arranged on that side of the steering wheel base which faces away from the driver. Fastening elements corresponding to the webs 340 of FIGS. 5 to 7 are then arranged on that housing half of the gearing housing which faces toward the driver.

Figure 8:
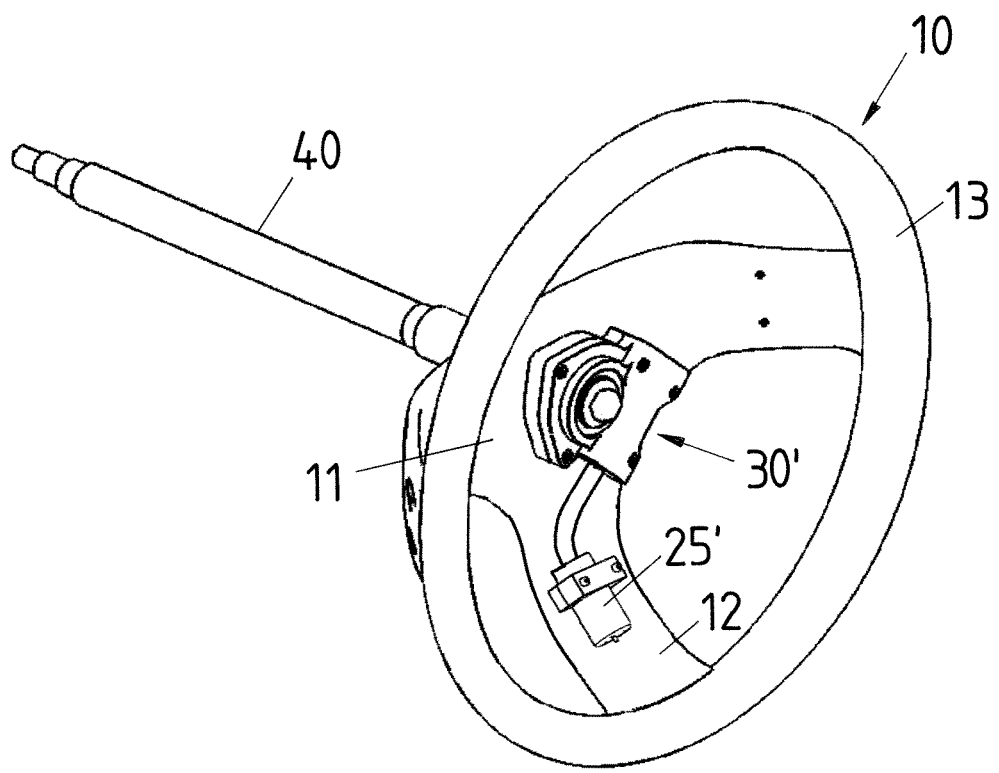
FIG. 8 shows a steering device in which the drive motor is arranged spatially separate from the gearing housing on the steering wheel.

FIG. 8 shows a steering device in which, in contrast to FIGS. 1 to 7, the drive motor is arranged together with the gearing elements in or on the gearing housing, the drive motor 25' is arranged spatially separate from the gearing housing 30' on the steering wheel. This can be advantageous for space reasons in the event of limited installation space being available. The drive motor 25' is for example accommodated, by way of suitable fastening means, in the region of a spoke 12 corresponding to FIG. 8. In such a case, the rotational axes of the drive motor 25' and of the drive worm or of some other input-side gearing element of the superposition gearing will generally not run coaxially. Rigid connections are therefore not possible for transmitting torques. In fact, a connection between the drive motor 25' and the gearing is provided which compensates the axial offset, for example using a flexible shaft, a flexible coupling or an articulated shaft.

The spatially separate arrangement of the drive motor can be realized both in the exemplary embodiment of FIGS. 1 to 4 and also in the exemplary embodiment of FIGS. 5 to 7. In connection with the exemplary embodiment of FIGS. 1 to 4, it is provided then that those constituents of the gearing housing which are integrated into the steering wheel base do not relate to the mounting or fixing of the drive motor.

The invention is not restricted in terms of its design to the above-illustrated exemplary embodiments; these are to be understood merely as examples. It can for example be provided that the steering wheel base is shaped in some other way, integrates at least one constituent of a gearing housing in some other way, or has some other shape of cutout for holding a gearing housing. The design of the steering shaft, of the steering wheel including the spokes and of the superposition gearing in the form of a worm gear mechanism are also be understood merely as examples. Finally, the gearing housing can also be formed in some other way, for example can be composed of more than two components and/or perform only bearing functions without providing a closed housing.

The invention claimed is:

1. A steering device for a motor vehicle comprising:
a steering wheel;
a superposition gearing; and
a gearing housing;
wherein the superposition gearing is arranged in the gearing housing;
wherein the superposition gearing is designed to transmit a motor-driven adjusting movement to a steering shaft;
wherein the steering wheel comprises a steering wheel rim, a plurality of spokes and a steering wheel base which serves for a connection to the steering shaft;
wherein the steering wheel base is integrally formed with spokes of the steering wheel without the use of connecting means;
wherein at least one constituent of the gearing housing, which constituent serves for mounting and/or fixing a gearing element of the superposition gearing or of a drive motor, is integrated into and formed in one piece with the steering wheel base of the steering wheel; and
wherein the gearing housing is formed of two housing parts, wherein one of the housing parts forms the at least one constituent of the gearing housing and is integrated into and formed in one piece with a side of the steering wheel base that faces away from the driver, and wherein the other housing part is placed onto the steering wheel base on the side of the steering wheel base that faces away from the driver.

2. The steering device according to claim 1, wherein at least one bearing receptacle for radial and/or axial mounting of a gearing element of the superposition gearing is integrated into the steering wheel base.

3. The steering device according to claim 1, wherein a holding flange or a constituent of a holding flange for fixing the drive motor is integrated into the steering wheel base.

4. The steering device according to claim 1, wherein the superposition gearing is embodied as a worm gear mechanism with a drive worm and a worm gear.

5. The steering device according to claim 4, wherein at least one bearing receptacle of a radial and/or axial bearing of the drive worm is integrated into the steering wheel base.

6. The steering device according to claim 4, wherein at least one bearing receptacle for mounting the worm gear is integrated into the steering wheel base.

7. The steering device according to claim 1, wherein the housing is of multi-part design, with at least one housing part being the at least one constituent of the gearing housing that is integrated into the steering wheel base.

8. The steering device according to claim 7, wherein the gearing housing has two housing shells with one of the housing shells being the at least one housing part that is integrated into the steering wheel base.

9. The steering device according to claim 1, wherein the at least one constituent of the gearing housing is formed as a structure which is raised in relation to the steering wheel base.

10. The steering device according to claim 1, wherein the steering device is designed such that a manual adjusting movement of the steering wheel is transmitted via the superposition gearing to the steering shaft.

11. The steering device according claim 1 wherein the drive motor is arranged in or on the gearing housing.

12. The steering device according to claim 1, wherein the drive motor is arranged spatially separate from the gearing housing in or on the steering wheel.

13. The steering device according to claim 12, wherein the drive motor is arranged in the region of a spoke on the steering wheel.

* * * * *